Sept. 9, 1958   G. A. LYON   2,851,309
WHEEL COVER
Filed March 4, 1953
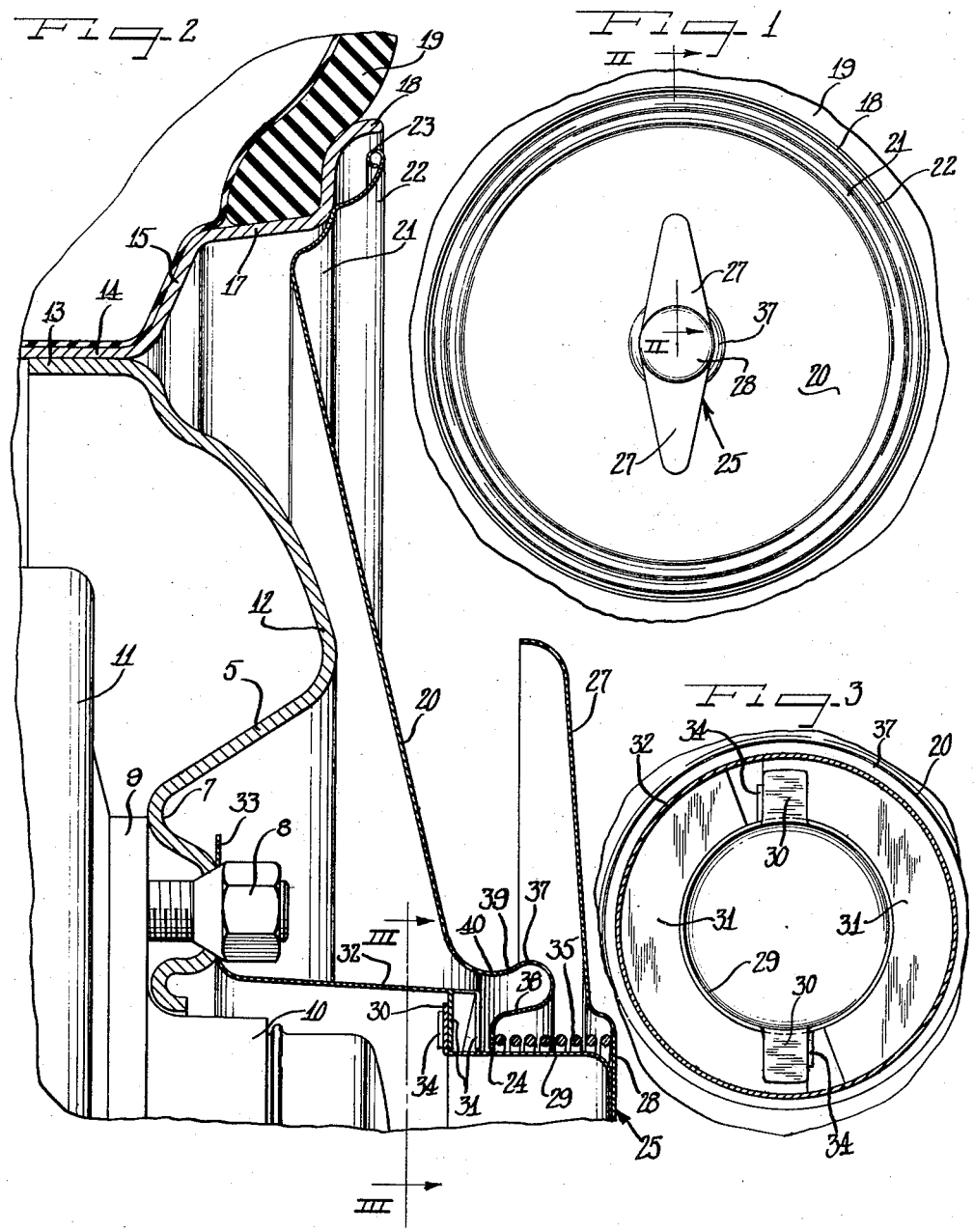
Inventor
George Albert Lyon

United States Patent Office 2,851,309
Patented Sept. 9, 1958

2,851,309

WHEEL COVER

George Albert Lyon, Detroit, Mich.

Application March 4, 1953, Serial No. 340,182

6 Claims. (Cl. 301—37)

The present invention relates to improvements in wheel structures and more particularly concerns the ornamental and protective covering of the outer side of vehicle wheels.

An object of the present invention is to provide a wheel structure with improved cover means for the outer side of the wheel.

Another object of the invention relates to improvements in wheel structures wherein a knock-off type of wheel cover is utilized adapted to be applied or removed by means of a central rotary attachment device.

A further object of the invention is to provide an improved wheel cover structure of the type applied by a rotary device at the center and equipped with means to prevent entry of water into the attachment device in the forward movement of the wheel or water running down the wheel during washing of the vehicle or from other reasons such as rain while the vehicle is standing outdoors.

Still another object of the invention is to provide an improved attachment means for wheel covers of the centrally attached type.

Other objects, features and advantages of the present invention will be readily apparent from the following detailed description of a preferred embodiment thereof taken in conjunction with the accompanying drawing, in which:

Figure 1 is a side elevational view of a wheel embodying features of the invention;

Figure 2 is an enlarged fragmentary substantially radial sectional view taken substantially on the line II—II of Figure 1; and Figure 3 is a fragmentary sectional detail view taken substantially on the line III—III of Figure 2.

The present invention is especially applicable to wheels of the kind embodying a wheel body 5 having a central dished bolt-on flange 7 which is attachable by means of suitable attachment bolts 8 to a hub flange 9 forming part of a vehicle axle hub structure 10. The flange 9 carries a brake drum 11.

The wheel body 5 has an annular intermediate reinforcing nose bulge 12 and a peripheral generally axially inwardly extending attachment flange 13 which is suitably attached to a base flange 14 of a tire rim. The tire rim has an outer side flange 15 extending from the base flange 13 and merging with a generally radially and axially outwardly extending intermediate flange 17 merging with a terminal flange 18. The tire rim is of the multi-flange drop center type adapted to support a pneumatic tire and tube assembly 19.

For ornamentally and protectively covering the outer side of the wheel, a wheel cover 20 is provided, the body of which is preferably of low angle frusto-conical form and dimensioned to substantially cover the wheel body 5 and at least a portion of the tire rim. At its outer margin the cover member or plate 20 is preferably formed with a reinforced, rib structure that may comprise annular ribs 21 and 22 directed generally radially and axially outwardly and terminating in an underturned reinforcing and finishing bead 23. The ribs 21 and 22 are preferably outwardly convex and at their juncture are adapted to engage against the tire rim substantially at juncture of the terminal flange 18 with the intermediate flange 17, substantially as shown.

The cover member 20 is adapted to be made from sheet steel such as stainless steel or brass plate and is preferably of substantial rigidity. At its center the cover plate 20 has an aperture 24 coaxial with the hub 10 and adapting the cover to be attached to the wheel by means of a centrally located rotary attachment device 25.

Herein, the attachment device 25 is constructed and arranged for application of the cover to the wheel in an axial direction and removal of the cover by reverse movement, and attachment or detachment of the cover by a simple turning action by manipulation of a handle 27. The handle 27 comprises a pair of readily manipulable oppositely directed ears or horns extending from a central circular cap 28 coaxially secured at its inner side to the base wall of a cup-like axially inwardly extending member 29 projecting through the central aperture 24 in the cover. At its inner end the hub member 29 has a pair of diametrically opposite radially outwardly extending attachment lugs or flanges 30 which are retainingly engageable with respective identical radially inwardly directed spiral cam flanges 31 on the axially outer end of a tubular adapter member 32 carried by the bolt-on flange 7 of the wheel body. For removable attachment of the adapter 32 to the bolt-on flange it is provided with radially outwardly extending flange means 33 at its inner end engageable with the bolt-on flange and attachable thereto by means of the attachment bolts 8. Internally the tubular adapter 32 is of sufficient diameter to accommodate the hub structure 10 therein.

In effecting connection of the attachment lugs 30 with the cam flanges 31, the lugs 30 are brought into position at the outer free ends of the cam flanges 31 and are then engaged with the axially inner sides of the respective cam flanges 31 by clockwise turning of the member 29 by means of the handle 27. This causes the attachment lugs 30 to cam progressively axially inwardly as the member 29 is turned, until the flanges or lugs 30 are stopped by engagement with limit or stop lugs 34 provided at the inner ends of the respective retaining cam flanges 31.

As the attachment member 29 is progressively drawn axially inwardly as an incident to turning the same into the spiral cam flanges 31 of the adapter member, resilient compression means, herein in the form of a coiled compression spring 35 is compressed by the cap member 28 against the margin of the cover 20 defining the aperture 24. This causes the substantially rigid cover member 20 to be placed under substantial axially inward compressive force to hold the outer margin of the cover member tight against the tire rim.

In order to substantially preclude the entry of water running along the outer side of the cover 20 into the latching mechanism 25, an annular baffle is provided on the cover 20 adjacent to the inner margin thereof defining the aperture 24 and behind the handle 27. To this end, the sheet metal of the cover 20 is provided with a generally axially outwardly directed annular fold-like rib 37 having a radially inner wall 38 spaced in clearance relation about the compression spring 35, and a radially outer wall 39 which is disposed in radially outwardly spaced relation to the inner wall 38. The outer wall 39 is formed in substantially undercut fashion, thereby defining a generally radially outwardly facing groove 40 adjacent juncture with the body of the cover 20. There is thus provided an annular gutter-like structure which will receive water such as rain water or the like that may run toward the center of the cover along the outer surface thereof in the running of the wheel or while the vehicle is standing, and causes the water to be deflected toward the opposite or trailing or lower side of the cover to drain off to the ground. It will also be observed that the inner wall 38 of the deflector rib flares generally axially and radially outwardly and this promotes drainage of any water that may nevertheless escape past the deflector rib toward the attachment device 25. It will be appreciated, of course, that the deflector rib 37 also affords substantial central reinforcement for the cover member 20 especially adjacent to the point of maximum compression force applied through the spring 35.

It will be understood that modifications and variations may be effected without departing from the scope of the novel concepts of the present invention.

I claim as my invention:

1. In a cover for disposition at the outer side of a vehicle wheel, a cover plate having a central opening defined by a flange, means cooperating with said flange at said central opening for attaching the cover to a wheel, said cover plate having a generally axially outwardly projecting annular fold-like rib therein about said central opening offset radially and axially outwardly relative to said flange and with the radially outer side of the rib undercut to provide a water deflector.

2. In a cover for disposition at the outer side of a vehicle wheel, a cover plate having a central opening, means at said central opening for attaching the cover to a wheel, said cover plate having a generally axially outwardly projecting annular fold-like rib therein about said central openings and with the radially outer side of the rib undercut to provide a water deflector, the radially inner side of said rib being flared axially and radially outwardly to promote drainage of water that may escape past the deflector rib.

3. In a cover for disposition at the outer side of a vehicle wheel, a cover plate having a central opening for passage therethrough of attachment means, said cover plate having in spaced relation to said opening an annular axially outwardly directed water deflector rib provided at its radially outer side with a generally radially outwardly directed groove and having at its radially inner side a generally axially outwardly opening annular recess for accommodating a cover-retaining member.

4. In a cover assembly, a cover plate, a rotary cup-like member extending through an opening in the cover plate and having an end portion facing axially outwardly, a handle member having a cap-like portion attached to said end portion of the cup-like member and extending radially marginally to a larger diameter than said end portion with such margin facing generally axially inwardly, means at the inner end of said cup-like member for latching interengagement with attachment means on a wheel, and a coiled compression spring between the radially extending margin of said cap-like portion and the margin of the cover plate about said opening for placing the cover plate under compression as an incident to latching action of said cup-like member.

5. In a cover for disposition at the outer side of a vehicle wheel, a circular cover plate having a central opening for accommodating therethrough a rotary attachment member, said attachment member having an outer portion provided with a cap of a diameter to overlie a substantial area of the plate about said opening, and a handle projecting laterally from said cap for manipulating the cap and said rotary member, said area of the cover plate about said opening including an annular flange disposed in a substantially radial plane with a generally axially outwardly projecting annular rib-like deflector projection encircling said flange and having the radially outer side thereof generally undercut for deflecting water from entering to said flange at the radially inner side of said deflector, said deflector and said flange providing an annular recess receptive of cover tensioning means behind and acted upon by said cap to thrust against said flange.

6. In a wheel structure including tire rim and wheel body parts, a cover assembly for disposition at the outer side of the wheel including a wheel overlying cover plate having a central opening, means projecting through said opening and manipulable from the outer side of the cover for cover retaining engagement with retaining means on the wheel body, said cover plate having about said opening gutter-like structure providing a water deflecting groove opening generally radially outwardly so as to prevent entry into said opening of water running along said cover plate, said gutter-like structure affording a depressed spring seat about said opening and said manipulable means having an annular portion facing toward said seat, with a tensioning spring thrustably opposing said seat and said facing portion and operable to maintain resilient tension toward the seat.

References Cited in the file of this patent

UNITED STATES PATENTS

| | | |
|---|---|---|
| 2,148,210 | Lyon | Feb. 21, 1939 |
| 2,159,881 | Booth | May 23, 1939 |
| 2,329,945 | Schatzman | Sept. 21, 1943 |

FOREIGN PATENTS

| | | |
|---|---|---|
| 32,542 | France | Jan. 24, 1928 |
| 271,126 | Italy | Jan. 30, 1930 |
| 415,681 | Great Britain | Aug. 30, 1934 |
| 436,894 | Italy | June 16, 1948 |